United States Patent
Ninomiya et al.

(10) Patent No.: US 10,703,145 B2
(45) Date of Patent: Jul. 7, 2020

(54) PNEUMATIC TIRE

(71) Applicant: SUMITOMO RUBBER INDUSTRIES, LTD., Kobe-shi, Hyogo (JP)

(72) Inventors: Hiroaki Ninomiya, Kobe (JP); Takashi Nishiwaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 603 days.

(21) Appl. No.: 15/402,852

(22) Filed: Jan. 10, 2017

(65) Prior Publication Data
US 2017/0210176 A1 Jul. 27, 2017

(30) Foreign Application Priority Data
Jan. 21, 2016 (JP) .................................. 2016-009930

(51) Int. Cl.
| B60C 11/04 | (2006.01) |
| B60C 11/03 | (2006.01) |
| B60C 11/12 | (2006.01) |
| B60C 11/13 | (2006.01) |

(52) U.S. Cl.
CPC .......... B60C 11/04 (2013.01); B60C 11/0306 (2013.01); B60C 11/042 (2013.01); B60C 11/12 (2013.01); B60C 11/1369 (2013.01); B60C 2011/0346 (2013.01)

(58) Field of Classification Search
None
See application file for complete search history.

(56) References Cited

U.S. PATENT DOCUMENTS

| D107,322 S | * | 12/1937 | Reel .............................. D12/605 |
| D170,765 S | * | 11/1953 | Newman ....................... D12/600 |
| D213,748 S | * | 4/1969 | Evans ........................... D12/594 |
| 4,230,512 A | * | 10/1980 | Makino ............... B60C 11/0306 |
| | | | 152/209.21 |
| 4,258,769 A | * | 3/1981 | Makino ................... B61C 11/04 |
| | | | 152/209.27 |
| 4,736,782 A | * | 4/1988 | Kanamaru .......... B60C 11/0306 |
| | | | 152/209.18 |
| 5,088,536 A | * | 2/1992 | Graas ...................... B60C 11/11 |
| | | | 152/209.22 |
| D517,470 S | * | 3/2006 | Welbes ........................ D12/594 |

(Continued)

FOREIGN PATENT DOCUMENTS

| DE | 19711852 | * | 12/1997 | |
| EP | 0506279 A1 | * | 9/1992 | ......... B60C 11/0306 |

(Continued)

Primary Examiner — Seyed Masoud Malekzadeh
Assistant Examiner — Manley L Cummins, IV
(74) Attorney, Agent, or Firm — Birch, Stewart, Kolasch & Birch, LLP

(57) ABSTRACT

A pneumatic tire comprises a tread portion 2 provided with at least one circumferentially continuously extending main groove 3. The main groove 3 has a zigzag periodical pattern formed by circumferentially repeatedly arranging a first oblique segment 11 and a second oblique segment 12 as a repeating unit which define one zigzag pitch. The first oblique segment 11 extends without being bent, and the second oblique segment 12 extends in a bent manner.

11 Claims, 7 Drawing Sheets

(56) References Cited

U.S. PATENT DOCUMENTS

| | | | | |
|---|---|---|---|---|
| D527,338 S | * | 8/2006 | Suzuki | D12/600 |
| D626,499 S | * | 11/2010 | Fujita | D12/544 |
| D642,974 S | * | 8/2011 | Koshio | D12/588 |
| D735,651 S | * | 8/2015 | Nomoto | D12/587 |
| D753,583 S | * | 4/2016 | Hao | D12/512 |
| D763,183 S | * | 8/2016 | Ono | D12/600 |
| 2002/0026972 A1 | * | 3/2002 | Ochi | B60C 11/11 152/209.28 |
| 2009/0218021 A1 | * | 9/2009 | Sekoguchi | B60C 11/0302 152/209.23 |
| 2012/0060990 A1 | * | 3/2012 | Otsuji | B60C 11/0302 152/209.28 |
| 2012/0132335 A1 | * | 5/2012 | Fujita | B60C 11/11 152/209.18 |
| 2014/0190606 A1 | * | 7/2014 | Takemoto | B60C 11/1218 152/209.8 |
| 2016/0176235 A1 | * | 6/2016 | Takayama | B60C 11/0306 152/209.2 |

FOREIGN PATENT DOCUMENTS

| | | | | |
|---|---|---|---|---|
| EP | 2689940 A1 | * | 1/2014 | B60C 11/0306 |
| EP | 2724873 A1 | * | 4/2014 | B60C 11/11 |
| EP | 3015287 | * | 6/2015 | B60C 11/11 |
| EP | 2905149 A2 | * | 8/2015 | B60C 11/0302 |
| GB | 2349366 | * | 11/2000 | |
| JP | 60025808 | * | 7/1983 | |
| JP | 62080102 | * | 4/1987 | |
| JP | 63154406 | * | 6/1988 | |
| JP | 02041906 | * | 2/1990 | |
| JP | 05178031 | * | 12/1991 | |
| JP | 60189607 | * | 9/1995 | |
| JP | 08244416 | * | 9/1996 | |
| JP | 10100616 | * | 4/1998 | |
| JP | 2008230385 | * | 10/2008 | |
| JP | 2010155502 | * | 7/2010 | |
| JP | 2014-184948 A | | 10/2014 | |
| WO | WO 2015093390 | * | 9/2015 | B60C 11/0302 |

* cited by examiner

PNEUMATIC TIRE

TECHNICAL FIELD

The present invention relates to a pneumatic tire capable of exerting excellent running performance on snowy/icy roads while maintaining the steering stability.

BACKGROUND ART

Japanese Patent Application Publication No. 2014-184948 (Patent Literature 1) discloses a pneumatic tire provided with a zigzag main groove having a zigzag periodical pattern. Compared with a straight main groove, a zigzag main groove is increased in the length of the edges, and thereby can increase a scratch frictional force.

In the pneumatic tire disclosed in Patent Literature 1, if the zigzag pitches or pitch lengths of the zigzag main groove are decreased in order to further increase the frictional force on snowy/icy roads, then a land region (blocks, rib) adjacent to the main groove becomes more likely to deform, therefore, the steering stability tends to deteriorate.

SUMMARY OF THE INVENTION

The present invention was made in view of the above, and a primary object thereof is to provide a pneumatic tire in which, by improving the configuration of a zigzag main groove, excellent running performance on snowy/icy roads can be obtained without sacrificing the steering stability.

According to the present invention, a pneumatic tire comprises:

a tread portion provided with at least one main groove extending continuously in the tire circumferential direction, wherein the or each main groove has a zigzag periodical pattern formed by repeatedly circumferentially arranging a first oblique segment and a second oblique segment as a repeating unit defining one zigzag pitch P1, the first oblique segment extends without being bent, and
the second oblique segment extends in a bent manner.

In the pneumatic tire according to the present invention, it is preferable that the first oblique segment is straight.

In the pneumatic tire according to the present invention, the first oblique segment may be arc-shaped.

In the pneumatic tire according to the present invention, it is preferable that the second oblique segment comprises a pair of second portions inclined to the opposite direction to the first portion, and
a first portion disposed therebetween and inclined to the same direction as the first oblique segment.

In the pneumatic tire according to the present invention, it is preferable that the second portions are longer than the first portion.

In the pneumatic tire according to the present invention, it is preferable that a maximum amplitude in the tire axial direction of the zigzag main groove is not greater than 3.0 times a maximum groove width of the zigzag main groove.

In the pneumatic tire according to the present invention, it is preferable that an amplitude of the second oblique segment is 0.30 to 0.75 times an amplitude of the zigzag configuration of the main groove.

In the pneumatic tire according to the present invention, it is preferable that the above-mentioned at least one main groove includes a pair of crown main grooves disposed in a tread crown portion, the crown main grooves are arranged such that phases of the zigzag configurations thereof are aligned, and a center land region defined between the crown main grooves is divided into a plurality of blocks by center transverse grooves connecting between the first oblique segments of one of the crown main grooves and the first oblique segments of the other crown main groove.

In the pneumatic tire according to the present invention, it is preferable that the center transverse grooves are inclined to the opposite direction to the first oblique segments.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

The tread edges Te are the axial outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

DESCRIPTION OF THE PREFERRED EMBODIMENT

An embodiment of the present invention will now be described in detail in conjunction with accompanying drawings. The present invention can be applied to various tires, and suitably applied to a winter tire. The pneumatic tire 1 in this embodiment is a winter tire for passenger cars.

Figure 1:
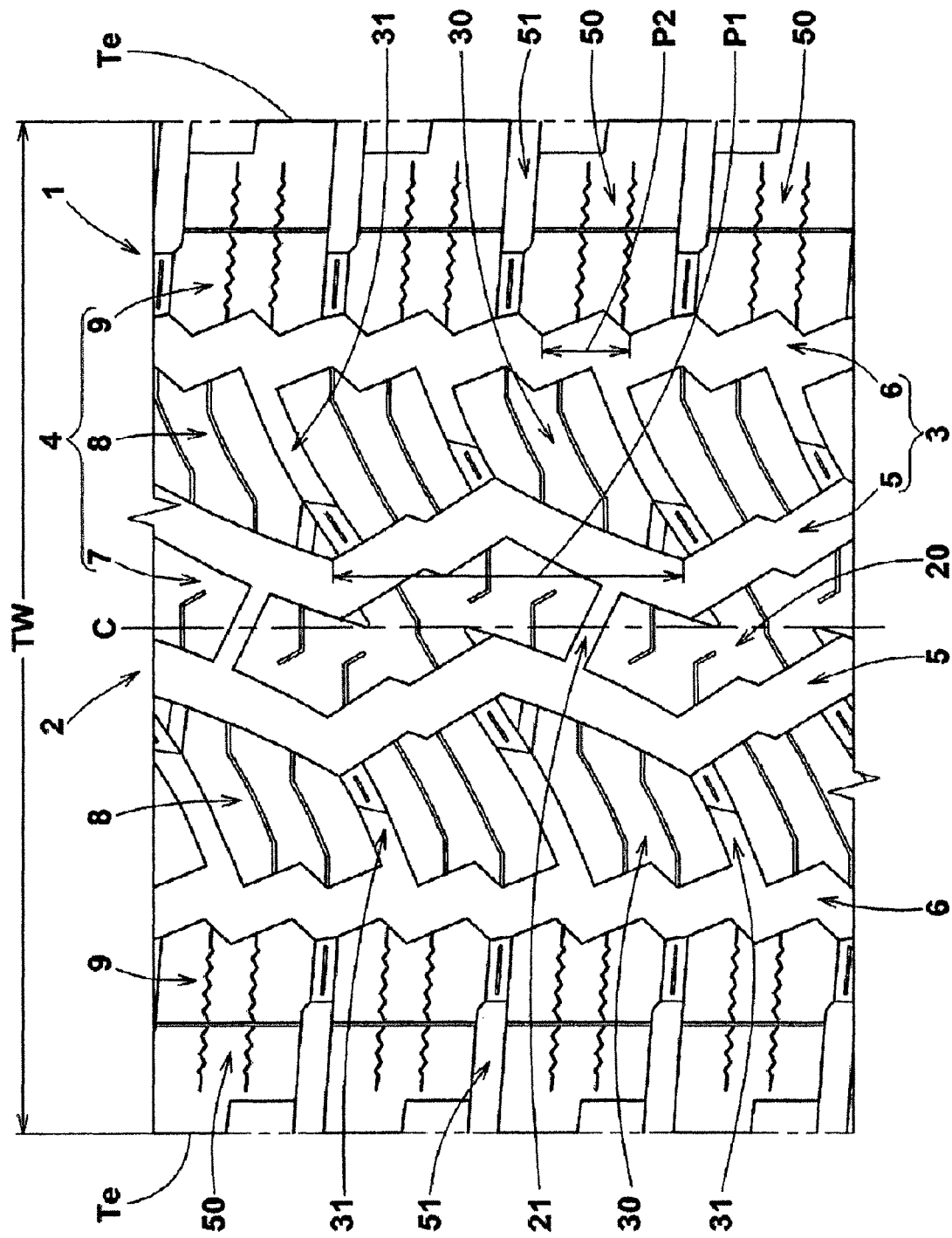
FIG. 1 is a developed partial view of the tread portion of a pneumatic tire as an embodiment of the present invention.

The tread portion 2 of the pneumatic tire 1 is shown in FIG. 1.

As shown in FIG. 1, the tread portion 2 is provided with a plurality of main grooves 3 extending continuously in the tire circumferential direction and a plurality of land regions 4 divided by the main grooves 3.

The main grooves 3 in this example include
a pair of crown main grooves 5 provided in a crown portion of the tread portion 2 and
a shoulder main groove 6 disposed axially outside each of the crown main grooves 5.

Figure 2:
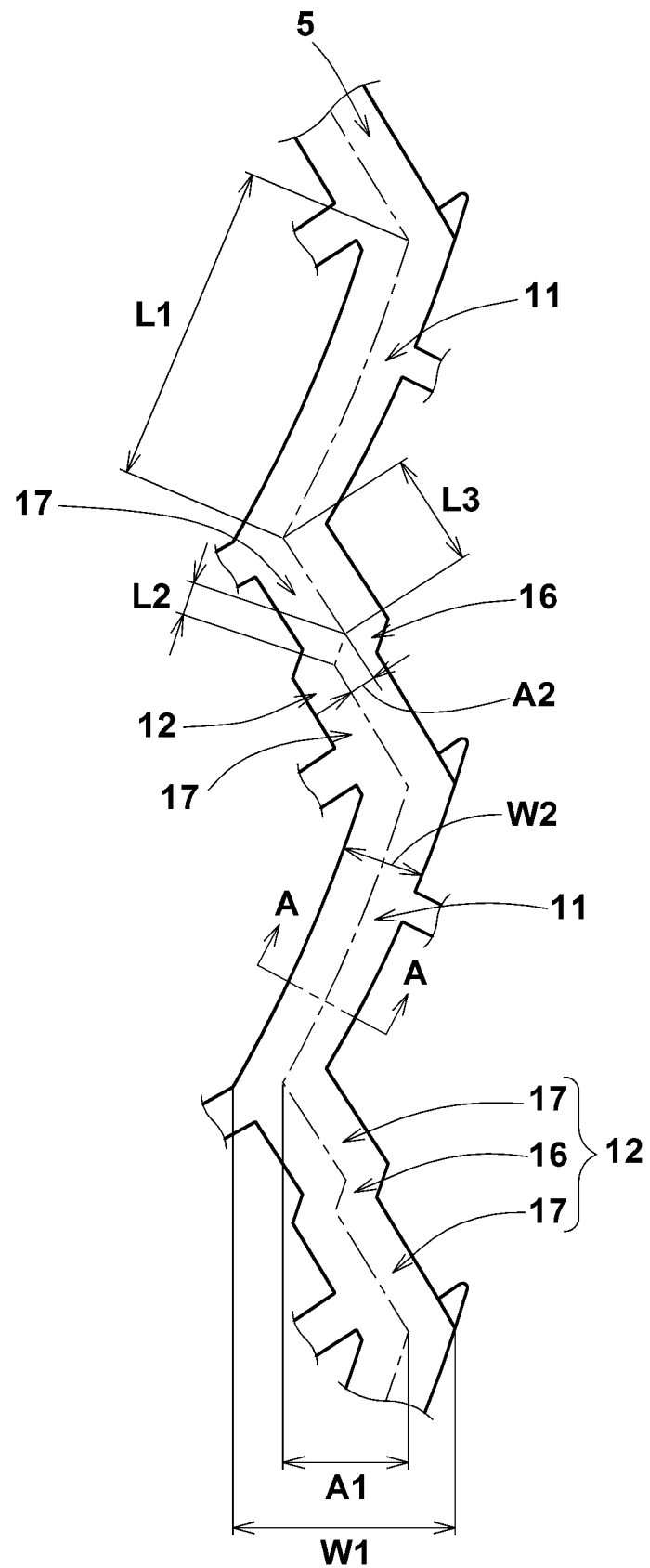
FIG. 2 is a magnified view showing an outline of the main groove (a crown main groove in FIG. 1).

As shown in FIG. 2, the crown main groove 5 has a zigzag periodical pattern with a first amplitude in which pattern a first oblique segment 11 and a second oblique segment 12 as a repeating unit defining one zigzag pitch P1 are repeatedly arranged in the tire circumferential direction. That is to say, a dogleg element consisting of the first oblique segment 11 and the second oblique segment 12 is a minimum repeating unit of the periodical pattern of the crown main groove 5.

The first oblique segment 11 extends without being bent whereas the second oblique segment is bent in a zigzag manner and has a second amplitude.

The crown main groove 5 configured as such can suppress excessive deformation of the land region partitioned by the main groove owing to the first oblique segment 11 extending without being bent, therefore, it is possible to maintain the steering stability.

On the other hand, the second oblique segment 12 extends in a bent manner and has a longer edge, therefore, it is possible to provide large frictional force on snowy/icy roads. Thereby, the pneumatic tire according to the present invention can exert excellent running performance on snowy/icy roads while maintaining the steering stability.

Although specific configurations to further exert the above described effects will now be described in detail, the present invention is not limited to such specific configurations.

It is preferable that the first oblique segment 11 is straight or arc-shaped. More preferably, the first oblique segment 11 is configured in the form of a smoothly curved arc which is convexed toward the inside in the tire axial direction. The first oblique segment 11 configured as such can deforms toward the tire equator C when running on snow-covered roads and compresses the snow therein firmly. Moreover, the first oblique segment 11 is easy to expand and contract in its length before and after the contact with the ground, therefore, it is helpful to effectively discharge the snow in the groove.

In order to increase the length of the edges while maintaining the steering stability, the angle $\theta 1$ (not shown) of the first oblique segment 11 with respect to the tire circumferential direction is preferably set in a range from 15 to 25 degrees, for example. The length L1 of the first oblique segment 11 is set in a range from 0.10 to 0.25 times the tread width TW, for example.

As shown in FIG. 2, the second oblique segment 12 in this example is composed of a pair of second portions 17 and a first portion 16 therebetween.

The first portion 16 is disposed in the vicinity of the center of the second oblique segment 12 in the tire circumferential direction. The first portion 16 is inclined to the same direction as the first oblique segment 11.

The second portions 17 are inclined to the opposite direction to the first portion 16 with respect to the tire circumferential direction.

It is preferable that each of the first portion 16 and the second portion 17 is shorter than the first oblique segment 11. For example, the length L2 of the first portion 16 is preferably set in a range from 0.10 to 0.20 times the length L1 of the first oblique segment 11. The length L3 of the second portion 17 is preferably set in a range from 0.30 to 0.40 times the length L1 of the first oblique segment 11.

The first portion 16 and the second portion 17 configured as such can increase the length of the edges effectively while suppressing the deformation of the land region adjacent thereto.

It is preferable that the length L3 of the second portion 17 is larger than the length L2 of the first portion 16. The length L3 of the second portion 17 is preferably not less than 2.5 times, more preferably not less than 2.7 times, and preferably not greater than 3.2 times, more preferably not greater than 3.0 times the length L3 of the first portion 16. Thereby, it is possible to suppress the deformation of the land region adjacent to the second oblique segment 12.

The second portions 17 in this example are inclined with respect to the tire circumferential direction at an angle $\theta 2$ (not shown) lager than that of the first oblique segment 11. Preferably, the angle $\theta 2$ is 25 to 35 degrees. The edges of such second portion 17 can increase the frictional force in the tire circumferential direction, and it is possible to improve the traction performance on snowy/icy roads.

It is preferable that, as a result of the first and second oblique segments 11 and 12 configured as described above, the crown main groove 5 is provided with a first amplitude A1 of from 4.0% to 8.0% of the tread width TW. Such crown main groove 5 can improve the steering stability on dry roads and the traction performance on snowy/icy roads in a good balance.

If the amplitude of the crown main groove 5 is too large, there is a possibility that the steering stability on dry roads is deteriorated and the uneven wear occurs in the groove edges of the crown main groove 5. Therefore, a maximum amplitude (peak-to-peak amplitude) W1 measured from the axially innermost end to the axially outermost end of the crown main groove 5 is preferably not greater than 3.0 times, more preferably not greater than 2.5 times a maximum amplitude W2 of the crown main groove 5.

It is preferable that, as a result of the first and second portions 16 and 17 configured as described above, the second oblique segment 12 is provided with an amplitude A2 of not less than 0.30 times, more preferably not less than 0.45 times, and not greater than 0.75 times, more preferably not greater than 0.60 times the amplitude A1 of the zigzag configuration of the crown main groove 5. When running on snow-covered roads, such second oblique segment 12 can compress the snow in the groove more firmly than the first oblique segment 11 while suppressing excessive deformation of the adjacent land region thereto, therefore, it is possible to obtain a large shearing force from the compared snow block.

Figure 3:
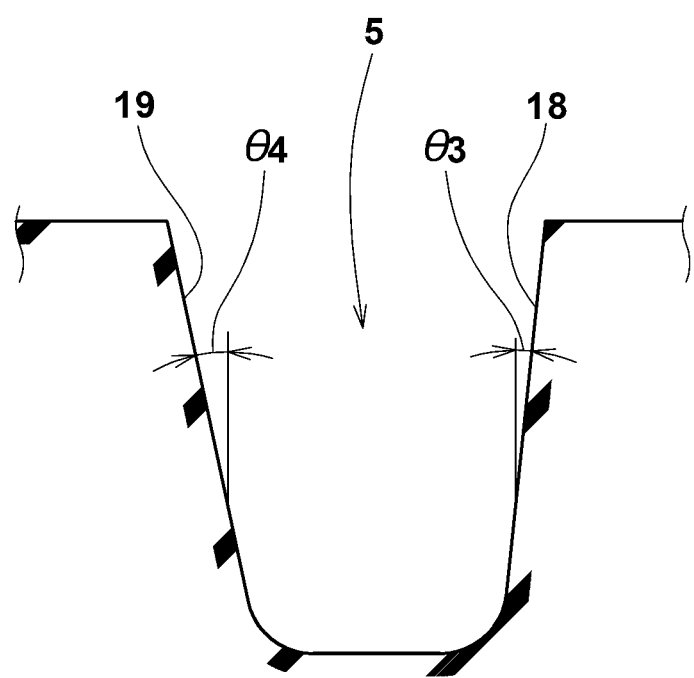
FIG. 3 is a cross-sectional view of the crown main groove taken along line A-A in FIG. 2.

FIG. 3 is a cross-sectional view of the crown main groove 5 taken along A-A line in FIG. 2.

It is preferable that, as shown in FIG. 3, the axially inner groove sidewall 18 and axially outer groove sidewall 19 of the crown main groove 5 are inclined at different angles from each other with respect to the tire radial direction.

In this example, the angle θ3 of the axially inner groove sidewall 18 with respect to the tire radial direction is smaller than the angle θ4 of the axially outer groove sidewall 19 with respect to the tire radial direction. For example, the angle θ3 is preferably set in a range from 5 to 20 degrees, and the angle θ4 is preferably set in a range from 10 to 25 degrees. Thereby, the axially outer groove sidewall 19 becomes easier to deform relatively, therefore, it becomes easier to discharge the snow in the groove when running on snow-covered roads.

It is preferable that the shoulder main groove 6 has a zigzag periodical pattern having zigzag pitches P2 smaller than those of the crown main groove 5 as shown in FIG. 1. The shoulder main groove 6 configured as such is increased in the length of the edges compared with a straight groove, therefore, it is possible to increase the scratch frictional force on snowy/icy roads.

By the above-described main grooves 3 (5, 6), the tread portion 2 is axially divided into a center land region 7, a pair of middle land regions 8 and a pair of shoulder land regions 9.

Figure 4:
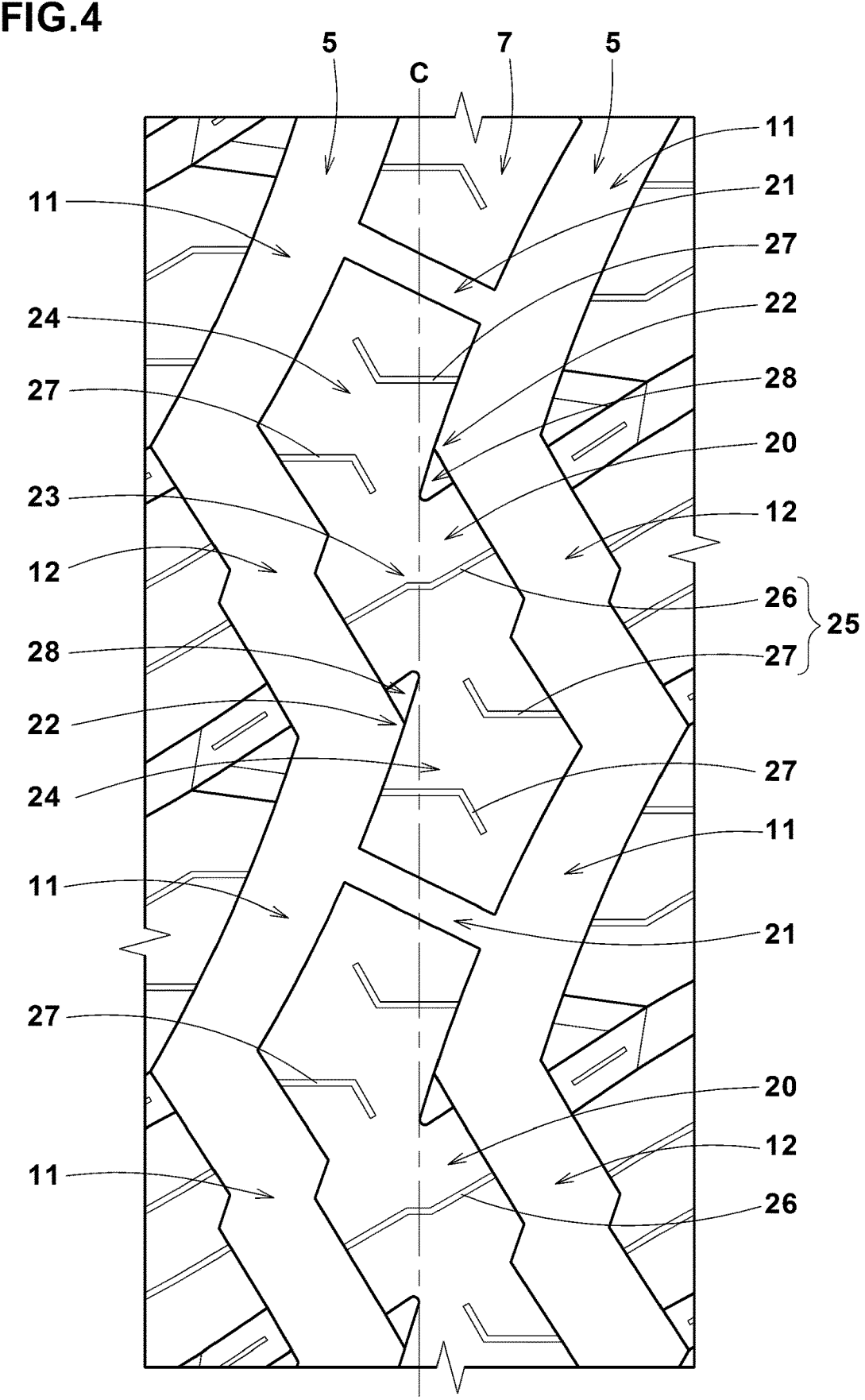
FIG. 4 is a magnified view showing a center land region between the crown main grooves shown in FIG. 1.

FIG. 4 shows a pair of the crown main grooves 5 and the center land region 7 defined therebetween. As shown, the phases of the zigzag configurations of the two crown main grooves 5 are aligned. Thus, the crown main grooves 5 are parallel with each other.

The center land region 7 is circumferentially divided into a plurality of center blocks 20 by center transverse grooves 21. The center transverse grooves 21 respectively extend from the first oblique segments 11 of one of the crown main grooves 5 to the respective opposite first oblique segments of the other crown main groove 5.

It is preferable that the center transverse grooves 21 are inclined to the opposite direction to the first oblique segments 11 inclined with respect to the tire circumferential direction. The center transverse grooves 21 configured as such can increase the frictional force in a different direction from the first oblique segments 11. This helps to improve the traction performance on snowy/icy roads in particular.

The center block 20 in this example comprises a pair of second block pieces 24 and a first block piece 23 therebetween, each inclined with respect to the tire axial direction. Preferably, the second block pieces 24 are each inclined to the opposite direction to the first block piece 23.

The center block 20 composed of such inclined block pieces 23 and 24 can deform moderately upon contacting with the ground. Thus, it is possible to suppress stuffing of snow in the crown main groove 5 when running on snow-covered roads.

The center block 20 in this example is provided with a plurality of center sipes 25. The center sipes 25 include a first center sipe 26 one end of which is connected to one of the crown main grooves 5 and the other end of which is connected to the other crown main groove 5, and a second center sipe 27 one end of which is connected to one of the crown main grooves 5 and the other end of which terminates within the block.

In this example, the first center sipe 26 is provided in the first block piece 23, and its one end is connected with the second oblique segment 12 of one of the crown main grooves 5 and the other end is connected with the second oblique segment 12 of the other crown main groove 5. The first center sipe 26 configured as such helps to increase the frictional force on snowy/icy roads. Moreover, the first center sipe 26 suppresses the deformation of the ground contacting surface of the first block piece 23 when running on dry roads, therefore, it is possible to suppress the uneven wear of the center block 20. The first center sipe 26 in this example is bent at two positions and composed of three straight segments which are two longer segments and a shorter segment therebetween.

It is preferable that the second center sipe 27 is bent at least partially in at least one position. The second center sipe 27 configured as such can maintain the apparent rigidity of the block when the opposing sidewalls of the sipe contact with each other, therefore, it is possible to maintain the steering stability on dry roads. The second center sipe 27 in this example is bent at a middle position, and composed of two straight segments.

The center block 20 in this example is preferably provided with a slot 28 at a recessed corner portion 22 between the edge of the first block piece 23 and the edge of the second block piece 24.

The slot 28 formed at such corner position 22 helps to compress the snow and discharge the compressed snow in cooperation with the deformation of the block when running on snow-covered roads. At this time, the snow in the slot 28 is combined with the snow in the crown main groove 5 and discharged together. Thereby, the slot 28 can help to discharge the snow in the crown main groove 5, and improve the on-snow performance.

Figure 5:
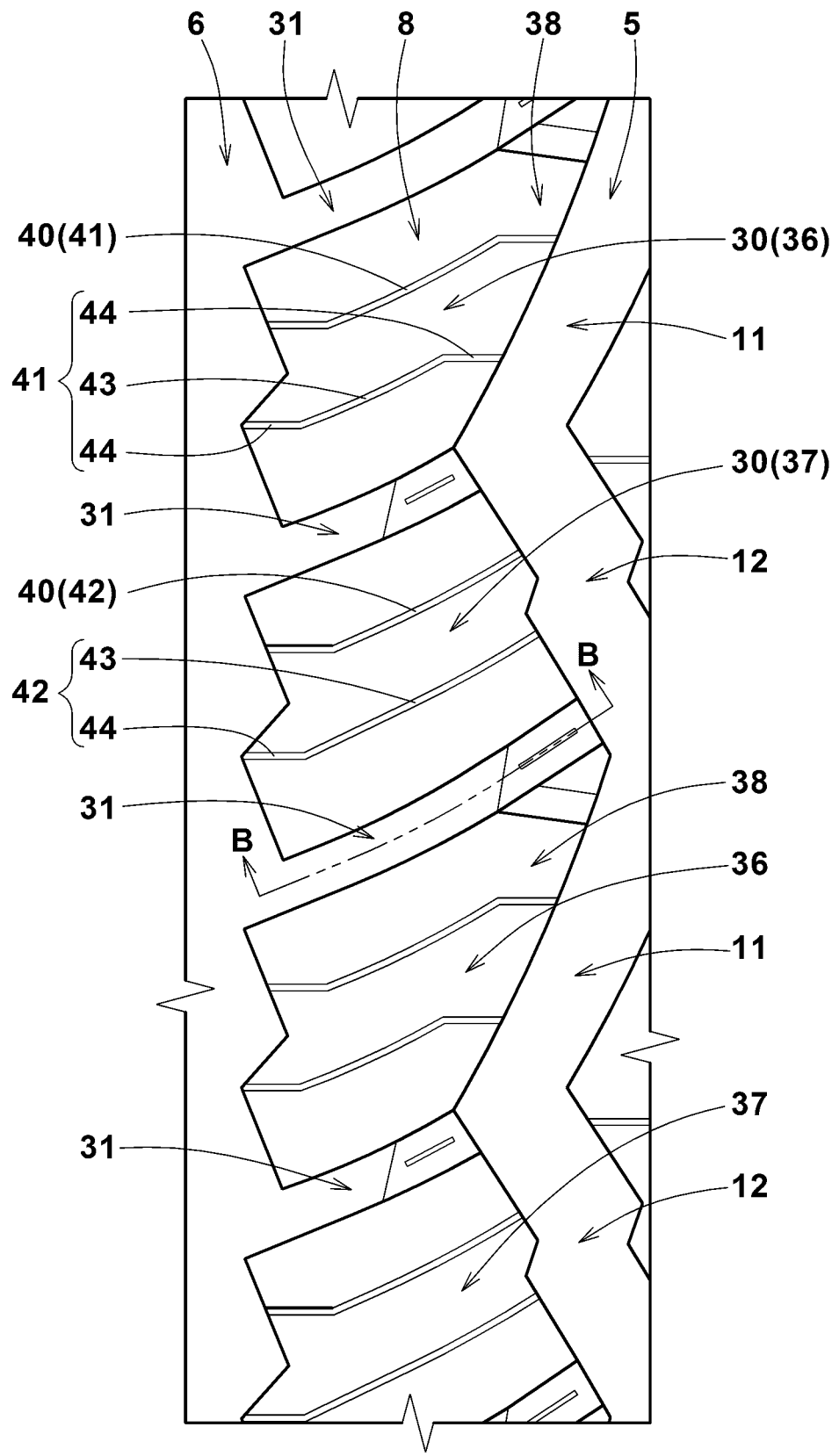
FIG. 5 is a magnified view of a middle land region on the axially outside of the crown main groove shown in FIG. 1.

FIG. 5 shows the middle land region 8 defined between the crown main groove 5 and the shoulder main groove 6. As shown, the middle land region 8 in this example is circumferentially divided into a plurality of middle blocks 30 by middle transverse grooves 31 connecting between the crown main groove 5 and the shoulder main groove 6.

Figure 6:
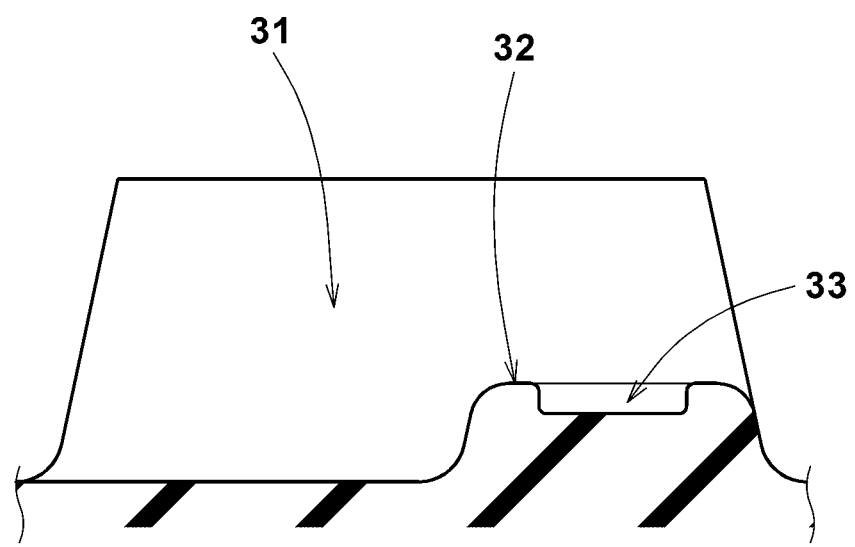
FIG. 6 is a cross-sectional view of a middle transverse groove taken along line B-B in FIG. 5 showing the depth thereof.

FIG. 6 is a cross-sectional view of the middle transverse groove 31 taken along line B-B in FIG. 5. As shown, each of the middle transverse grooves 31 is preferably provided with a tie-bar 32. The tie-bar 32 rises from the groove bottom and connects between the middle blocks 30 on both sides thereof. In this example, the tie-bar 32 is disposed in an axially inner portion of the groove, therefore, the rigidity of the middle land region is increased in its axially inner portion, and the steering stability on dry roads can be improved.

The tie-bar 32 in this embodiment is preferably provided in the radially outer surface thereof with a groove bottom sipe 33 extending along the widthwise center line of the groove 31. The groove bottom sipe 33 can opens when the middle land region 8 contacts with the ground, therefore, it is possible to suppress the stuffing of snow in the crown main groove 5 and the middle transverse groove 31.

As shown in FIG. 5, the middle blocks 30 in this example include a first middle block 36 whose axially inner edge is defined by the first oblique segment 11 of the crown main groove 5, and
a second middle block 37 whose axially inner edge is defined by the second oblique segment 12 of the crown main groove 5.

It is preferable that the first middle block 36 has a taper portion 38 tapered toward the crown main groove 5 as shown in FIG. 5. Such first middle block 36 can easy to deform upon contacting with the ground to prompt discharging of the snow compressed into the crown main groove 5. Further, the middle transverse groove 31 in this embodiment is provided with the tie-bar 32, therefore, the taper portion 38 can deform toward the crown main groove 5, and thereby, the snow in the crown main groove 5 is compressed firmly when running on snow-covered roads. As a result, a large shearing force can be obtained from the firmly compressed snow block.

In order to increase the frictional force on snowy/icy roads, each of the middle blocks 30 is preferably provided with a plurality of middle sipes 40. The middle sipes 40 in this embodiment are first middle sipes 41 disposed in each first middle block 36, and second middle sipes 42 disposed in each second middle block 37.

The first middle sipes 41 of the first middle block 36 each comprise a first portion 43 inclined with respect to the tire axial direction, and
a pair of second portions 44 disposed on both sides of the first portion and extending along the tire axial direction.

The first middle sipes 41 configured as such can increase the frictional force on snowy/icy roads while maintaining the apparent rigidity of the first middle block 36.

The second middle sipes 42 of the second middle block 37 each comprise a first portion 43 inclined with respect to the tire axial direction, and a second portion 44 disposed only on the axially outside of the first portion 43 and extending along the tire axial direction. Thereby, the second middle block 37 and the first middle block 36 become easy to deform in a different manner from each other, therefore, it is possible to suppress the stuffing of snow in the vicinity of the tie-bar 32 of the middle transverse groove 31.

Figure 7:
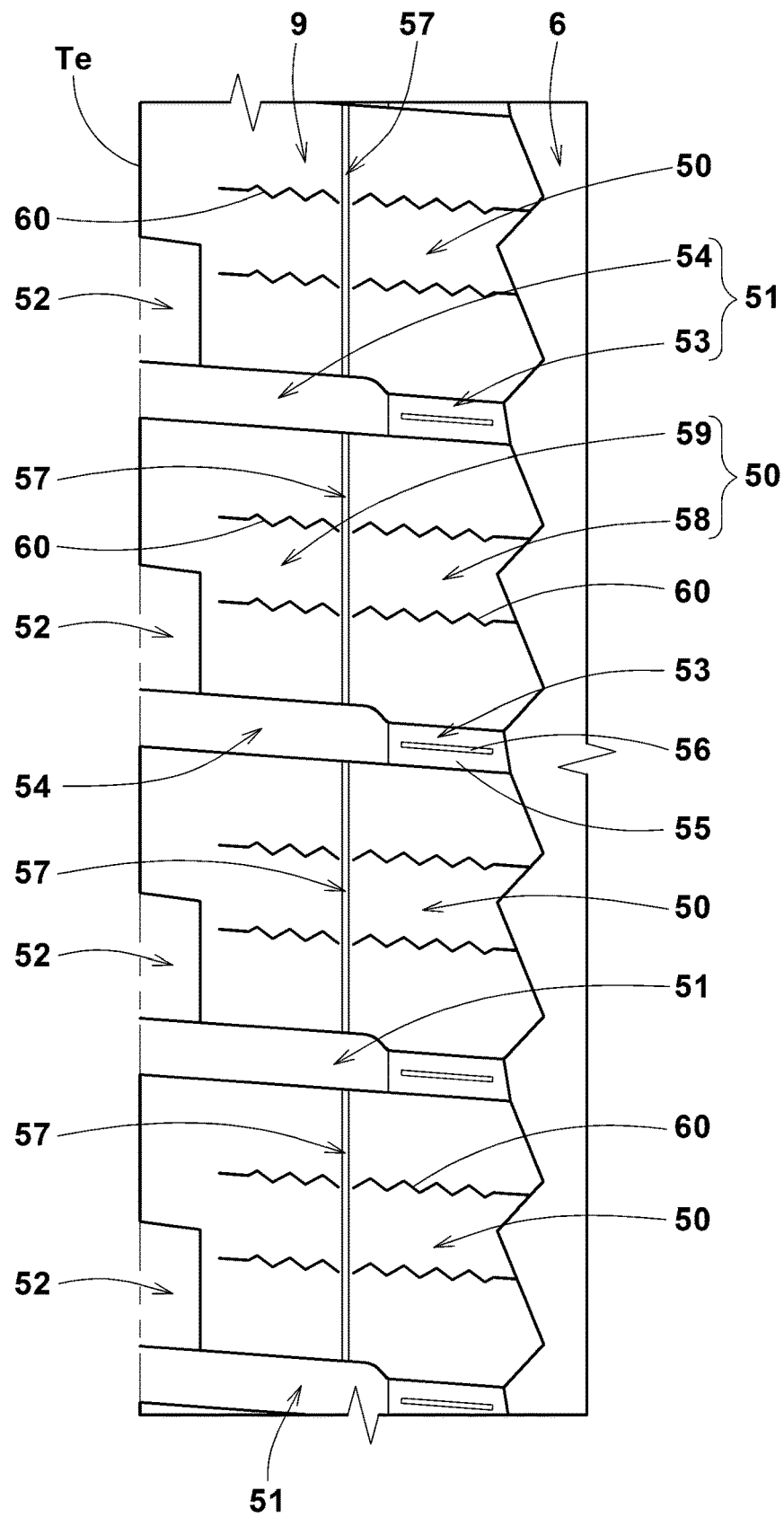
FIG. 7 is a magnified view of a shoulder land region formed axially outside the middle land region shown in FIG. 1.

FIG. 7 shows the shoulder land region 9 defined as being between the shoulder main groove 6 and the tread edge Te.

The shoulder land region 9 in this example is circumferentially divided into shoulder blocks 50 by shoulder transverse grooves 51 extending from the shoulder main groove 6 to the tread edge Te.

The shoulder transverse grooves 51 in this example each comprise an axially inner first groove portion 53 and an axially outer second groove portion 54.

The first groove portion 53 is preferably provided with a tie-bar 55 rising from the groove bottom and connecting between the blocks on the both sides thereof as with the middle transverse groove 31 (shown in FIG. 6). The tie-bar 55 is preferably provided with a groove bottom sipe 56 similar to the groove bottom sipe 33 shown in FIG. 6.

The second groove portion 54 has a larger width than the first groove portion 53. Thereby, the width of the shoulder transverse groove 51 increases stepwise toward the outside in the tire axial direction in order to improve the wandering performance on snowy/icy roads.

In order to further increase the above-described effects, the shoulder block 50 is preferably provided with a concaved portion 52 by cutting off a part of the block edge which defines a part of the tread edge Te so that the concaved portion 52 is connected to an axially outside part of the second groove portion 54.

Further, the shoulder blocks 50 are each provided with a shoulder narrow groove 57 connecting between a pair of the shoulder transverse grooves 51 adjacent in the tire circumferential direction. Thereby, the shoulder block 50 is axially subdivided into an axially inside block piece 58 and an axially outside block piece 59.

Furthermore, each of the shoulder blocks 50 is preferably provided with a shoulder sipe 60 intersecting with the shoulder narrow groove 57. The shoulder sipe 60 preferably has an axially inner end connected to the shoulder main groove 6 and an axially outer end terminating within the shoulder block 50. Further, it is preferable that the shoulder sipe 60 extends in a zigzag manner. In this embodiment, two shoulder sipes 60 are disposed in each shoulder block 50. The shoulder sipe 60 configured as such can increase the frictional force on snowy/icy roads while maintaining the apparent rigidity of the shoulder block 50.

While detailed description has been made of the pneumatic tire as an embodiment of the present invention, the present invention can be embodied in various forms without being limited to the illustrated embodiment.

Working Examples

Pneumatic tires of size 275/55R20 were made by way of test based on the tread pattern shown in FIG. 1. Further, as a comparative example, a pneumatic tire having a tread pattern based on that shown in FIG. 1 was made, wherein both of the first oblique segment and the second oblique segment extended without being bent. The test tires were evaluated in respect to the traction performance on snowy/icy roads, and the steering stability on dry roads.

The common specifications of the test tires and the test methods are as follows.
Rim: 20×9.0 J
Tire pressure: 250 kPa
Test car: displacement of 3700 cc, 4WD-car
Tire mounting position: all wheels
<Traction Performance on Snowy/Icy Road>

According to the ASTM F1805 test methods, frictional forces exerted on the test tires were measured while the test car was driven on snowy/icy roads at a constant speed of 8 km/h. The results are indicated in Table 1 by an index based on the frictional force of the comparative example being 100, wherein the larger the numeric value, the better the traction performance on snowy/icy roads is.
<Steering Stability on Dry Road>

The steering stability was evaluated based on the driver's feeling while the test car was driven on a dry road surface of a test course.

The results are indicated in Table 1 by an evaluation point based on the comparative example being 100, wherein the larger the numeric value, the better the steering stability is.

TABLE 1

| Tire | Comparative example | Working example 1 | Working example 2 | Working example 3 | Working example 4 |
|---|---|---|---|---|---|
| Center main groove Max. amplitude W1/ Center main groove width W2 | 2.0 | 2.0 | 1.5 | 1.8 | 2.5 |
| Second oblique segment amplitude A2/ Center main groove amplitude A1 | 0 | 0.60 | 0.60 | 0.60 | 0.60 |
| Traction performance on Snowy/icy road | 100 | 105 | 103 | 104 | 106 |
| Steering Stability on Dry road | 100 | 101 | 102 | 102 | 101 |

TABLE 1-continued

| Tire | Working example 5 | Working example 6 | Working example 7 | Working example 8 | Working example 9 |
|---|---|---|---|---|---|
| Center main groove Max. amplitude W1/ Center main groove width W2 | 3.0 | 2.0 | 2.0 | 2.0 | 2.0 |
| Second oblique segment amplitude A2/ Center main groove amplitude A1 | 0.60 | 0.30 | 0.45 | 0.75 | 0.90 |
| Traction performance on Snowy/icy road | 107 | 106 | 105 | 104 | 102 |
| Steering Stability on Dry road | 100 | 99 | 101 | 102 | 103 |

From the test results, it was confirmed that the tires as the working examples exerted excellent running performance on snowy/icy roads while maintaining the steering stability.

REFERENCE SIGNS LIST 2 tread portion
3 main groove
11 first oblique segment
12 second oblique segment

The invention claimed is:

1. A pneumatic tire comprising:
a tread portion provided with a pair of zigzag crown main grooves disposed parallel with each other extending continuously in the tire circumferential direction, and composed of first oblique segments and second oblique segments arranged alternately in a tire circumferential direction,
wherein
the first oblique segments are inclined to one direction with respect to the tire circumferential direction,
edges of each said first oblique segment extend along a straight line or alternatively a curved axially inwardly convex line in a top view of the first oblique segment, and
the first oblique segments have a length L1,
each of the second oblique segments is made up of a first portion and a pair of second portions, wherein
the first portion is disposed between the second portions and inclined to the same direction as the first oblique segments with respect to the tire circumferential direction,
the second portions are inclined to opposite direction of the first portion with respect to the tire circumferential direction,
the first portion has a length L2 in a range from 0.10 to 0.20 times the length L1 of the first oblique segments, and
the second portions have a length L3 in a range from 0.30 to 0.40 times the length L1 of the first oblique segments,
wherein
a center land region defined between the pair of crown main grooves is divided into a plurality of blocks by center transverse grooves respectively connecting between the first oblique segments of one of the crown main grooves and the first oblique segments of other of the crown main grooves,
the tread portion is further provided with a pair of circumferentially continuously extending shoulder main grooves respectively disposed axially outside the respective crown main grooves, and
the shoulder main grooves are zigzag grooves having zigzag pitches P2 smaller than the crown main groove zigzag pitches P1,
a pair of shoulder land regions of the tread portion each defined between one of the shoulder main grooves and an adjacent tread edge are each circumferentially divided into shoulder blocks by shoulder transverse grooves extending from said one of the shoulder main grooves to said adjacent tread edge, and
a pair of middle land regions of the tread portion each defined between one of the crown main grooves and adjacent one of the shoulder main grooves are each circumferentially divided into a plurality of middle blocks by middle transverse grooves connecting between said one of the crown main grooves and said adjacent one of the shoulder main grooves.

2. The pneumatic tire according to claim 1, wherein each said edge of the first oblique segment is straight in the top view of the first oblique segment.

3. The pneumatic tire according to claim 1, wherein each said edge of the first oblique segment is curved in the top view of the first oblique segment.

4. The pneumatic tire according to claim 1, wherein a maximum amplitude in a tire axial direction of the zigzag of said crown main grooves is not greater than 3.0 times a maximum groove width of the crown main grooves measured perpendicularly to the longitudinal direction of the crown main grooves.

5. The pneumatic tire according to claim 4, wherein an amplitude of each said second oblique segments measured perpendicularly to the longitudinal direction thereof is 0.30 to 0.75 times said maximum amplitude of the zigzag of the crown main grooves.

6. The pneumatic tire according to claim 1, wherein each of the center transverse grooves is inclined to the opposite direction to the first oblique segments with respect to the tire circumferential direction over the entire length of said each of the center transverse grooves.

7. The pneumatic tire according to claim 1, wherein in a top view of each of the second oblique segments, each of edges of the first portion and the second portions is straight.

8. The pneumatic tire according to claim 1, wherein the length L1 of each said first oblique segment is in a range from 0.10 to 0.25 times a tread width TW of the tread portion.

9. The pneumatic tire according to claim 1, wherein in each said second oblique segment, the length L3 of each of the second portions is in a range from 2.5 to than 3.2 times the length L2 of the first portion.

10. A pneumatic tire comprising:
a tread portion provided with a pair of zigzag crown main grooves disposed parallel with each other extending continuously in the tire circumferential direction, and composed of first oblique segments and second oblique segments arranged alternately in a tire circumferential direction, wherein
the first oblique segments are inclined to one direction with respect to the tire circumferential direction, edges of each said first oblique segment extend along a straight line or alternatively a curved axially inwardly convex line in a top view of the first oblique segment, and the first oblique segments have a length L1, each of the second oblique segments is made up of a first portion and a pair of second portions, wherein the first portion is disposed between the second portions and inclined to the same direction as the first oblique segments with respect to the tire circumferential direction, the second portions are inclined to opposite direction of the first portion with respect to the tire circumferential direction, the first portion has a length L2 in a range from 0.10 to 0.20 times the length L1 of the first oblique segments, and the second portions have a length L3 in a range from 0.30 to 0.40 times the length L1 of the first oblique segments, wherein
a center land region defined between the pair of crown main grooves is divided into a plurality of blocks by center transverse grooves respectively connecting between the first oblique segments of one of the crown main grooves and the first oblique segments of other of the crown main grooves, the tread portion is further provided with a pair of circumferentially continuously extending shoulder main grooves respectively disposed axially outside the respective crown main grooves, the shoulder main grooves are zigzag grooves having zigzag pitches P2 smaller than the crown main groove zigzag pitches P1, a pair of shoulder land regions of the tread portion each defined between one of the shoulder main grooves and an adjacent tread edge are each circumferentially divided into shoulder blocks by shoulder transverse grooves extending from said one of the shoulder main grooves to said adjacent tread edge, and each of the shoulder transverse grooves is provided in its groove bottom with a tie-bar rising from the groove bottom to connect between the shoulder blocks on both sides of said each of the shoulder transverse grooves.

11. A pneumatic tire comprising:
a tread portion provided with a pair of zigzag crown main grooves disposed parallel with each other extending continuously in the tire circumferential direction, and composed of first oblique segments and second oblique segments arranged alternately in a tire circumferential direction, wherein
the first oblique segments are inclined to one direction with respect to the tire circumferential direction, edges of each said first oblique segment extend along a straight line or alternatively a curved axially inwardly convex line in a top view of the first oblique segment, and the first oblique segments have a length L1, each of the second oblique segments is made up of a first portion and a pair of second portions, wherein the first portion is disposed between the second portions and inclined to the same direction as the first oblique segments with respect to the tire circumferential direction, the second portions are inclined to opposite direction of the first portion with respect to the tire circumferential direction, the first portion has a length L2 in a range from 0.10 to 0.20 times the length L1 of the first oblique segments, and the second portions have a length L3 in a range from 0.30 to 0.40 times the length L1 of the first oblique segments, wherein
a center land region defined between the pair of crown main grooves is divided into a plurality of blocks by center transverse grooves respectively connecting between the first oblique segments of one of the crown main grooves and the first oblique segments of other of the crown main grooves, the tread portion is further provided with a pair of circumferentially continuously extending shoulder main grooves respectively disposed axially outside the respective crown main grooves, and the shoulder main grooves are zigzag grooves having zigzag pitches P2 smaller than the crown main groove zigzag pitches P1, a pair of shoulder land regions of the tread portion each defined between one of the shoulder main grooves and an adjacent tread edge are each circumferentially divided into shoulder blocks by shoulder transverse grooves extending from said one of the shoulder main grooves to said adjacent tread edge, a pair of middle land regions of the tread portion each defined between one of the crown main grooves and adjacent one of the shoulder main grooves are each circumferentially divided into a plurality of middle blocks by middle transverse grooves connecting between said one of the crown main grooves and said adjacent one of the shoulder main grooves, and each of the middle transverse grooves is provided in its groove bottom with a tie-bar rising from the groove bottom to connect between the middle blocks on both sides of said each of the middle transverse grooves.

* * * * *